(12) United States Patent
Ohyama

(10) Patent No.: US 6,317,155 B1
(45) Date of Patent: *Nov. 13, 2001

(54) IMAGE INPUT APPARATUS WITH ILLUMINATION DEVICES STORED AWAY FROM CAMERA IMAGE PICKUP

(75) Inventor: Atsushi Ohyama, Yokohama (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/629,572

(22) Filed: Apr. 9, 1996

(30) Foreign Application Priority Data

Apr. 11, 1995 (JP) .................................................. 7-085402
Apr. 11, 1995 (JP) .................................................. 7-085403

(51) Int. Cl.[7] .......................... H04N 5/225; H04N 1/40; G03B 27/52; G03B 27/54

(52) U.S. Cl. ........................... 348/373; 358/471; 355/21; 355/70

(58) Field of Search ..................................... 348/373, 370, 348/376, 375; 358/509, 510, 475, 479, 487, 497; 235/471; 353/490, 66, 85, 87, 83; 362/802, 251, 394, 31, 33, 269; 345/102; 349/5, 65; 355/21, 119, 120, 75, 64, 39, 70

(56) References Cited

U.S. PATENT DOCUMENTS

| | | | |
|---|---|---|---|
| 4,916,550 | * | 4/1990 | Miyake ................................. 348/373 |
| 5,247,330 | * | 9/1993 | Ohyama ............................... 348/373 |
| 5,642,206 | * | 6/1997 | Yamamori ............................ 348/370 |

* cited by examiner

Primary Examiner—Andrew B. Christensen
(74) Attorney, Agent, or Firm—Morgan & Finnegan, LLP

(57) ABSTRACT

An image input apparatus for picking up an image of an object includes an original table (4) having an object placing surface, a camera head (2), a post (3) which supports the camera head (2) to be located above the original table (4) and can be raised/lowered and is arranged at the corner of the original table (4), illumination devices (5,6) for illuminating an object (50) which are folded and stored in side surface portions (4b) of the original table (4), and a transmission illumination device (13) which is illuminated by the illumination devices (5,6).

14 Claims, 12 Drawing Sheets

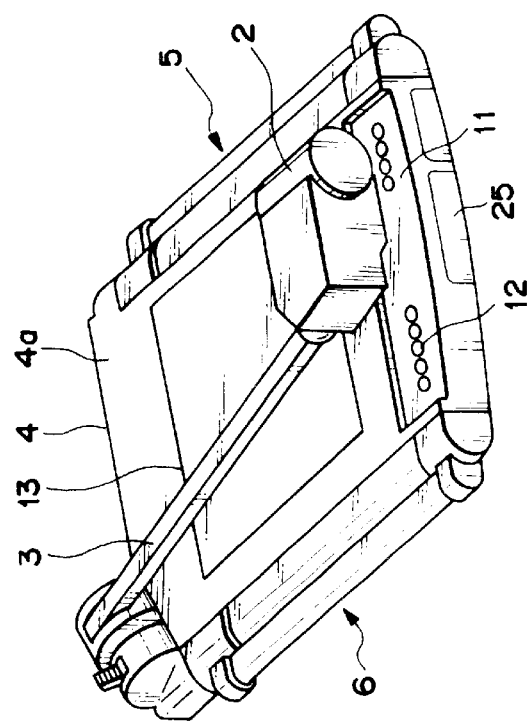
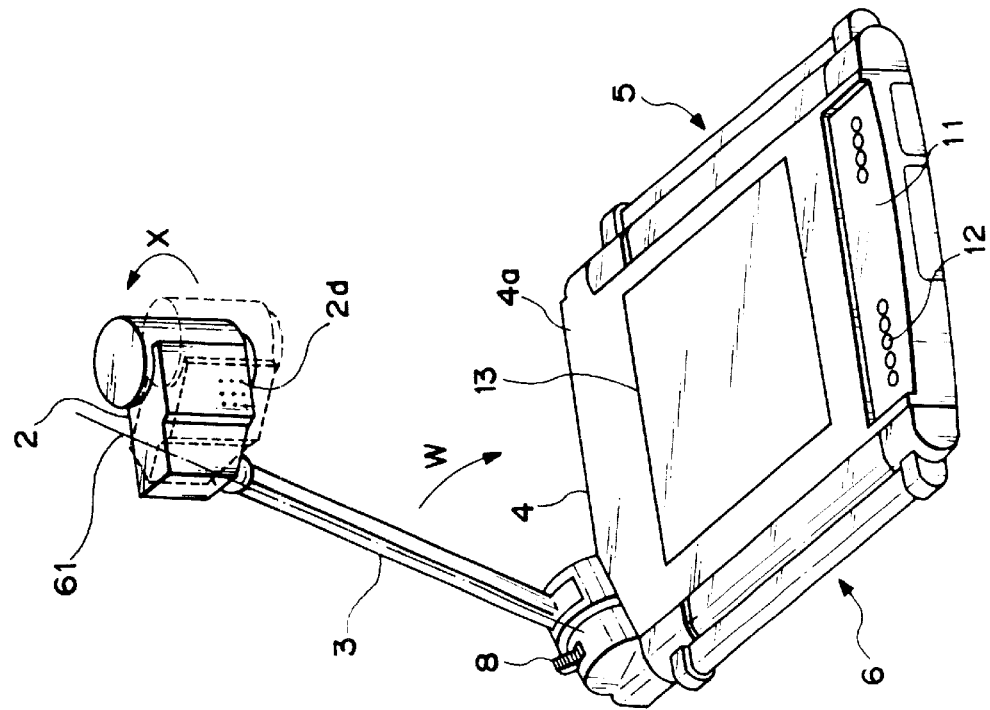
FIG. 8B
FIG. 8A

IMAGE INPUT APPARATUS WITH ILLUMINATION DEVICES STORED AWAY FROM CAMERA IMAGE PICKUP

BACKGROUND OF THE INVENTION

The present invention relates to an image input apparatus which picks up an image of an original such as a document, OHP sheet, or the like as an object, and outputting the image information to an external monitor.

Conventionally, an image input apparatus, which picks up an image of an object using a camera serving as an image pickup means, and displays the picked-up image information on an external monitor or the like, has been popularly used.

In recent years, a compact, portable image input apparatus which can be used in a meeting or presentation is becoming increasingly popular.

FIGS. 12A and 12B are perspective views showing the arrangement of a conventional portable image input apparatus. Referring to FIG. 12A, reference numeral 100 denotes a lens; 101, a camera head serving as an image pickup means; 102, an arm; 103, a post; 104, an original table; 119, a base portion; 105, an illumination device (right); and 106, an illumination device (left). In particular, in this image input apparatus, the camera head 101, the arm 102, the post 103, and the illumination devices 105 and 106 are foldable to allow a user to easily carry this apparatus anywhere.

The camera head 101 comprising the lens 100 is axially supported by the arm 102 to be pivotal about a fulcrum 107 within a predetermined range. The arm 102 is axially supported by the post 103 to be pivotal about a fulcrum 108 within a predetermined range. Furthermore, the post 103 is axially supported by the base portion 119 to be pivotal about a fulcrum 109 within a predetermined range. The camera head 101, the arm 102, and the post 103 can be pivoted about their fulcrums 107, 108, and 109, and can be locked at an image pickup position (a state shown in FIG. 12A) or a storage position (a state shown in FIG. 12B).

Reference numeral 110 denotes an unlock button. Upon depression of the button 110, the camera head 101 can be unlocked from the locked state and can be pivoted. Reference numeral 111 denotes an unlock button; and 112, another unlock button. When these buttons 111 and 112 are depressed, the arm 102 and the post 103 can be unlocked from the locked state, and can be pivoted.

The folding operation upon storage of the image input apparatus will be explained below.

First, the illumination devices 105 and 106 are folded. As shown in FIG. 12A, the illumination device 105 is pivoted in the direction of an arrow A in FIG. 12A until it contacts an object placing surface 104a of the original table 104. Also, the illumination device 106 is pivoted in the direction of an arrow B in FIG. 12A until it contacts the illumination device 105.

Next, as shown in FIG. 12A, the camera head 101 is pivoted in the direction of an arrow C in FIG. 12A by depressing the unlock button 110, and is locked at the storage position. Subsequently, the arm 102 is pivoted in the direction of an arrow D in FIG. 12A by depressing the unlock button 111, and is locked at the storage position. Then, the post 103 is pivoted in the direction of an arrow E in FIG. 12A by depressing the unlock button 112, and is locked at the storage position. In this manner, the folding operations of the respective members upon storage are completed, and the apparatus main body in the storage state is shown in FIG. 12B. Upon carrying, a carrying handle 118 is pulled out from the original table 104. When the image input apparatus is unfolded in an image pickup operation, operations opposite to those in the storage operation can be performed.

However, upon storage of in the conventional image input apparatus, the arm 102 for supporting the camera head 101, the post 103 for supporting them, and the illumination devices 105 and 106 must be appropriately folded in a predetermined order in consideration of an accurate assembling/storage order.

On the other hand, the base portion 119 which foldably supports the illumination devices 105 and 106 protrudes from the object placing surface 104a on the entire rear surface region of the original table 104. For this reason, when an object, e.g., an end portion 116a, on the side of an operation panel 117 of an original 116 is to be widened, if the original 116 is moved in the direction of an arrow S in FIG. 12A, it undesirably contacts a side surface 119a of the base portion 119, resulting in poor operability.

It is, therefore, an object of the present invention to provide an image input apparatus which allows an easy and adequate handling operation.

SUMMARY OF THE INVENTION

An image input apparatus of the present invention is characterized by the following arrangement.

That is, an image input apparatus for picking up an image of an object using image pickup means, and outputting an image signal of the object, comprises:

a base portion on which the object is placed;

a post for supporting the image pickup means to be located above the base portion; and illumination means for illuminating the object, wherein the post can be raised/lowered from/to a surface, on which the object is placed, of the base portion, and the illumination means can be raised/lowered from/to and is foldable to a side portion of the base portion.

With this arrangement, a user can easily assemble and store the apparatus regardless of an operation order.

More preferably, the apparatus further comprises: transmission illumination means for illuminating a surface, on which the object is placed, of the base portion from a rear side, and the illumination means, which is folded to the side portion of the base portion, is used as a light source of the transmission illumination means.

With this arrangement, the cost of the apparatus is reduced.

Also, an image input apparatus of the present invention is characterized by the following arrangement.

An image input apparatus for picking up an image of an object using image pickup means, and outputting an image signal of the object, comprises:

a base portion on which the object is placed;

a post for supporting the image pickup means to be located above the base portion;

illumination means for illuminating the object; and transmission illumination means for illuminating a surface, on which the object is placed, of the base portion from a rear side, wherein the post can be raised/lowered from/to a surface, on which the object is placed, of the base portion, and the illumination means can be raised/lowered from/to and is foldable to a side portion of the base portion.

With this arrangement, a user can easily assemble and store the apparatus regardless of the operation order.

More preferably, the apparatus further comprises:

a switch for turning on the illumination means and the transmission illumination means;

detection means for detecting a position of the illumination means; and control means for, when a user operates the switch and when the position of the illumination means corresponds to a storage position, inhibiting the illumination means from being turned on, and for, when the position of the illumination means is other than the storage position, inhibiting the transmission illumination means from being turned on.

Alternatively, the apparatus further comprises:

a switch for turning on the illumination means and the transmission illumination means;

detection means for detecting a position of the illumination means; and control means for, when a user operates the switch and when the position of the illumination means corresponds to a storage position, inhibiting the illumination means from being turned on and turning on the transmission illumination means, and for, when the position of the illumination means is other than the storage position, inhibiting the transmission illumination means from being turned on and turning on the illumination means.

With this arrangement, an optimal image pickup condition can be obtained in correspondence with each object.

In either of the above arrangements, preferably, the post and the illumination means can be solely or simultaneously raised/lowered.

With this arrangement, a user can easily assemble and store the apparatus regardless of the operation order.

In addition, when the illumination means is folded, the illumination means can be stored at a level lower than a level of a surface on which the object is placed. One end of the post is axially supported on a corner of the base portion.

Thus operability of arrangements of an original in an image pick up operation can be improved.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIGS. 8A and 8B are perspective views for explaining the operation upon storage of the image input apparatus according to the embodiment of the present invention;

FIGS. 12A and 12B are perspective views showing the arrangement of an image input apparatus as a prior art, in which FIG. 12A shows a used state and FIG. 12B shows a storage state.

DETAILED DESCRIPTION OF THE PREFERRED EMBODIMENT

The preferred embodiment of an image input apparatus according to the present invention will be described below with reference to FIGS. 1 to 10.

Figure 1:
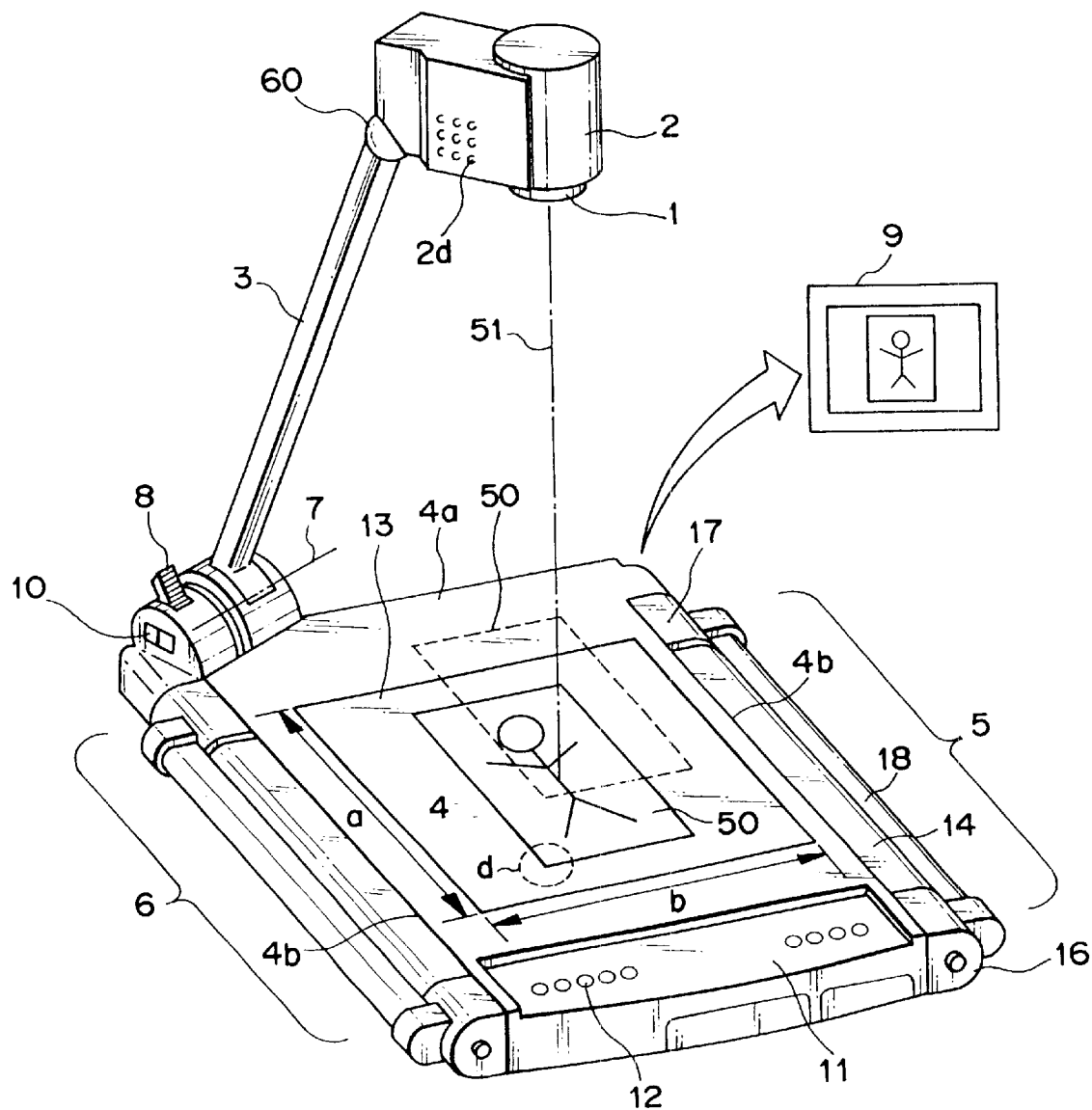
FIG. 1 is a perspective view showing the overall arrangement of an image input apparatus according to an embodiment of the present invention.

Referring to FIG. 1, reference numeral 1 denotes a lens; 2, a camera head serving as an image pickup means; 3, a post; 4, an original table; 5, an illumination device (right R); 6, an illumination device (left L); and 13, a transmission illumination device. The original table 4 comprises an object placing surface 4a with the transmission illumination device 13, and side surface portions 4b for respectively storing the illumination devices 5 and 6.

The camera head 2 with the lens 1 is axially supported by the post 3 to be pivotal by a pivot mechanism (to be described later). The post 3 is axially supported by the original table 4 to be pivotal about a fulcrum 7 within a predetermined range. The post 3 can be locked at an image pickup position illustrated in FIG. 1 or a storage position (to be described later) when it is pivoted about the fulcrum 7.

Furthermore, the fulcrum 7 is arranged on the left corner behind the original table 4 in FIG. 1, and with this fulcrum 7, the post 3 is axially supported to be raised/lowered from/to the original table 4. In FIG. 1, reference numeral 8 denotes a release lever for releasing the locked state of the post 3. The post 3 is to be pivoted after the locked state of the post 3 is released by the release lever 8.

The illumination devices 5 and 6 are axially supported to be pivotal with respect to the two side surface portions 4b of the original table 4. These illumination devices 5 and 6 are stored in the two side surface portions 4b of the original table 4, as shown in FIG. 1, in a normal environment, e.g., in a bright room. The right and left illumination devices 5 and 6 have the same basic arrangement, and have symmetrical structures in the right-and-left direction. The arrangement of the illumination device 5 will be described below. Note that the illumination device 6 has the same arrangement unless otherwise specified. The illumination device 5 comprises a lamp case 14, joints 16 and 17, and a support pipe 18 as its main constituting members.

The transmission illumination device 13 is constituted by a milk white diffusion plate which is arranged at a level equal to or lower than (recessed from) that of the object placing surface 4a of the original table 4, and a light source (not shown; e.g., a fluorescent lamp) built in the original table 4 at a position below the diffusion plate. A detailed description of these members of the transmission illumination device 13 will be omitted. In the outer appearance of the transmission illumination device 13 in FIG. 1, only the milk white diffusion plate is seen. The size a×b of this diffusion plate is preferably set to be 317×230 mm so as to be slightly larger than the JIS A4 size (297×210 mm; landscape position). Furthermore, the diffusion plate roughly matches the image pickup region at the wide-angle end, and can be used as a reference when an object is placed on the object placing surface 4a.

Furthermore, reference numeral 9 denotes a video monitor connected to the image input apparatus. The video monitor 9 displays an image of an object such as a document placed on the original table 4. A power switch 10 of the image input apparatus main body is arranged near the side portion of the fulcrum 7. Reference numeral 11 denotes an operation panel arranged on the front portion of the original table 4. The operation panel 11 has an illumination switch (SW) 12 of the illumination devices 5 and 6 or the transmission illumination device 13, zoom and focus buttons for controlling the lens 1, and the like.

A normal object image pickup operation sequence will be explained below with reference to FIG. 1.

In an image pickup operation, the post 3 for supporting the camera head 2, and the camera head 2 are set at the image pickup position illustrated in FIG. 1. When the power switch 10 is turned on, the apparatus is ready to perform an image pickup operation. At this time, the white balance is automatically adjusted. At the same time, the lens 1 adjusts its focusing state on the original table 4 (object placing surface 4a) and sets its field angle at the wide-angle end side. When an object is already placed within the image pickup region of the original table 4, the lens adjusts its focusing state on the object.

Subsequently, when an operator places an object such as an original 50 to be picked up on substantially the central portion of the original table 4, an image of the document 50 placed on the object placing surface 4a is displayed on the screen of the monitor 9. The operator moves the original 50 on the object placing surface 4a to adjust its position and angle as needed, so that the image of the placed original 50 is displayed at substantially the central portion of the screen of the monitor 9. Furthermore, the operator operates the zoom button on the operation panel 11 arranged on the front portion of the original table 4 to adjust the size (field angle) of the image of the original 50 displayed on the screen of the monitor 9, as needed. In this case, since the operation panel 11 has auto and manual focus buttons, the focusing state can be adjusted as needed by operating these buttons.

In the apparatus of the present invention, in order to improve handling of an object, i.e., to allow easy movement of an object on the original table 4 during the image pickup operation, projecting portions are eliminated from the object placing surface 4a of the original table 4 as much as possible, thus improving the degree of freedom upon placing of the object. More specifically, in the illumination devices 5 and 6 in the storage state (the state shown in FIG. 1), the lamp cases 14 and the joints 16 and 17 are stored at positions so as not to protrude from the object placing surface 4a. More specifically, the upper surfaces of the lamp cases 14 and the joints 16 and 17 in the storage state are held at a level equal to or slightly lower than that of the object placing surface 4a. Furthermore, as shown in FIG. 1, the fulcrum 7 of the post 3 which supports the camera head 2 is arranged at the rear left corner position when viewed from the front portion of the original table 4. In this embodiment, the fulcrum 7 is arranged at the rear left corner position but may be arranged at the rear right corner position.

Therefore, since the object placing surface 4a of the original table 4 is almost flat except for the fulcrum 7 of the post 3, an object such as the original 50 or the like placed on the object placing surface 4a can be freely moved in all directions, i.e., back-and-forth and right-and-left directions except for a limited direction. With this arrangement, when a portion d of the original 50 is to be displayed in an enlarged scale, the original 50 can be easily moved so that the portion d is located on an optical axis 51 of the lens 1 (the state of the original 50 at this time is indicated by a dotted line in FIG. 1), and the portion to be observed of the original 50 can be quickly displayed.

Figure 9:
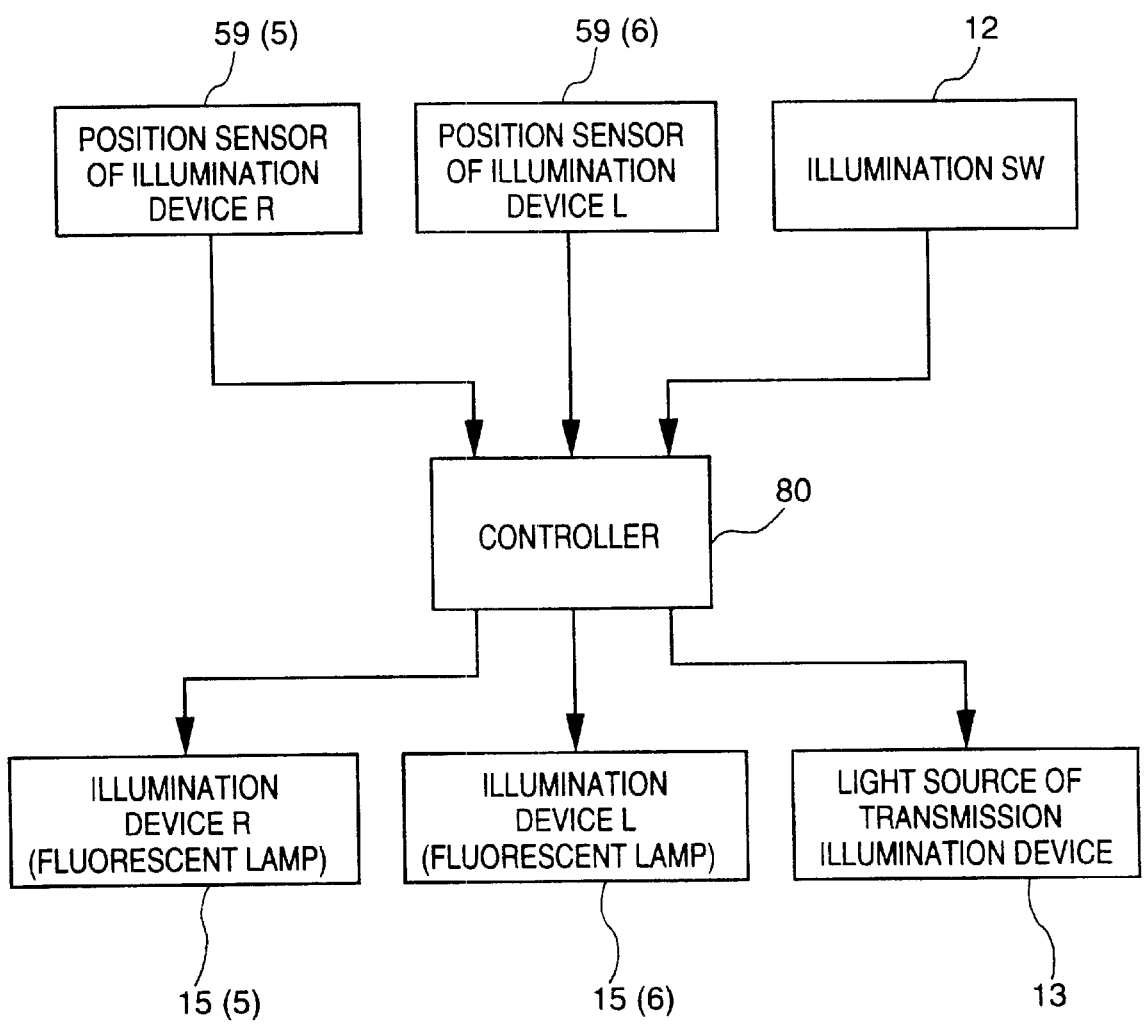
FIG. 9 is a block diagram showing the arrangement of a system controller in the image input apparatus according to the embodiment of the present invention.
Figure 10:
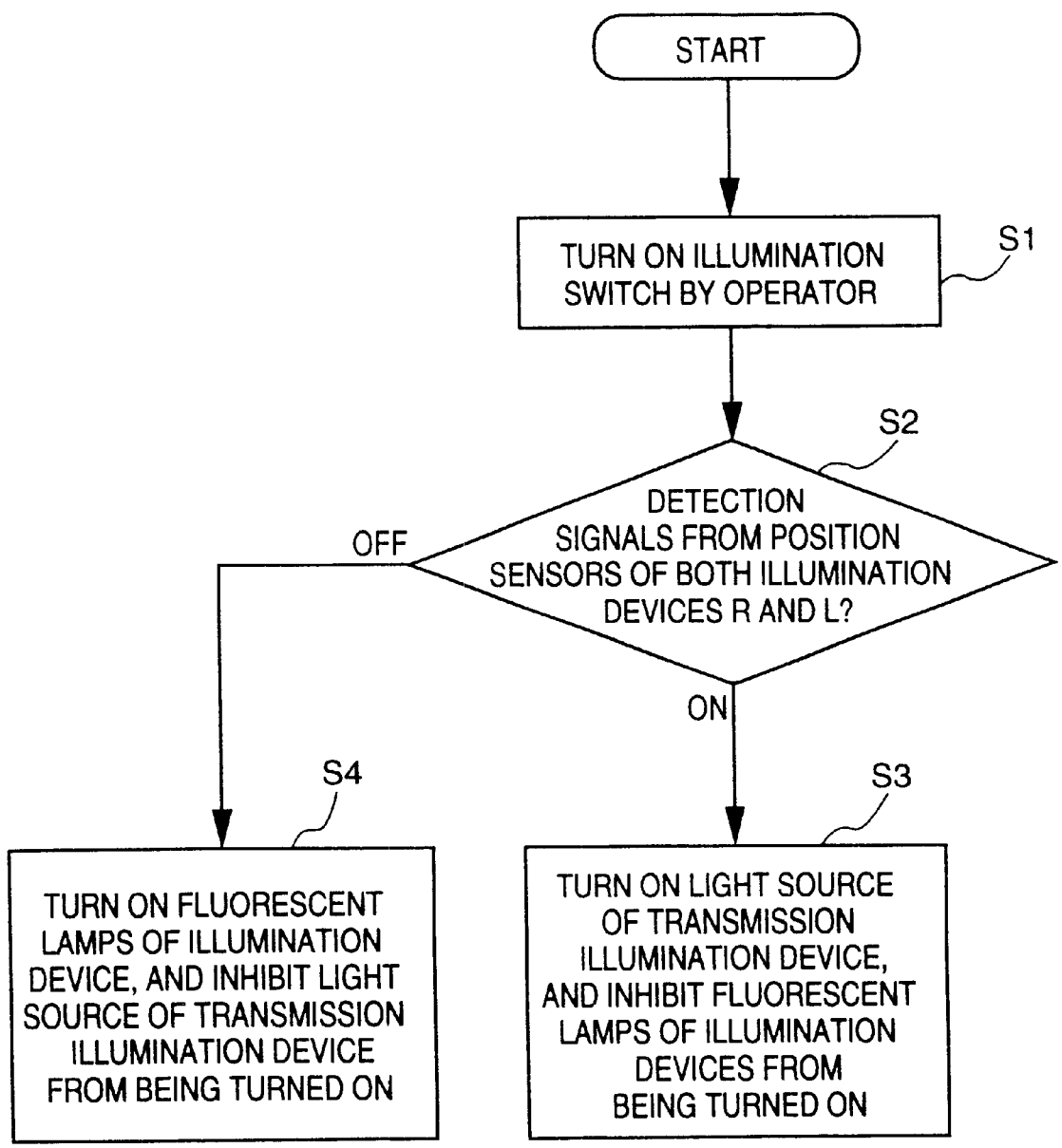
FIG. 10 is a flow chart for explaining the operations of the illumination device and a transmission illumination device in image input apparatus of the present invention.

When an image on a transparent original such as a film, an OHp sheet, or the like is to be picked up, the illumination switch 12 provided to the operation panel 11 is turned on. The illumination switch 12 of the image input apparatus serves as a power switch common to the illumination devices 5 and 6, and the transmission illumination device 13. The illumination devices 5 and 6 have position sensors 59 (to be described later; not shown in FIG. 1), which detect the postures of the illumination devices 5 and 6. Detection signals from these sensors are transmitted to a controller 80 arranged in the apparatus, as shown in FIGS. 9 and 10 (which will be described in detail later), and the controller performs the following control actions. That is, when the illumination devices 5 and 6 are set in the storage state, the position sensors 59 are turned on. Then, the illumination switch 12 has been turned on so that the light source (not shown) of the transmission illumination device 13 is turned on (step S3).

When the light source of the transmission illumination device 13 is turned on, light is diffused on the entire diffusion plate described above. Also, when the illumination switch 12 is turned on, the white balance is automatically adjusted. Then, the operator need only place an object of a transparent original such as a film on the diffusion plate of the transmission illumination device 13. In this manner, when the object is a transparent original, since light is transmitted through the original from below, a clear object image can be displayed on the screen of the monitor 9. In particular, when a negative image of, e.g.,. a negative film is to be picked up, a normal positive image can be displayed by operating a negative/positive reversal button arranged on the operation panel 11.

In a normal image pickup state, the apparatus is used as described above. However, when the light amount of a light source near the image input apparatus main body is insufficient, and an original image displayed on the monitor 9 is not easy to see, the illumination devices 5 and 6 are assembled at positions shown in FIG. 6 and the apparatus is used in this state. Note that the assembling operations of the illumination devices 5 and 6 will be described later.

The structure of the illumination devices 5 and 6 will be described below with reference to FIGS. 2A to 4. As described above, since the illumination devices 5 and 6 have symmetrical structures in the right-and-left direction, only the structure of the illumination device 5 will be described below.

Figure 2A:
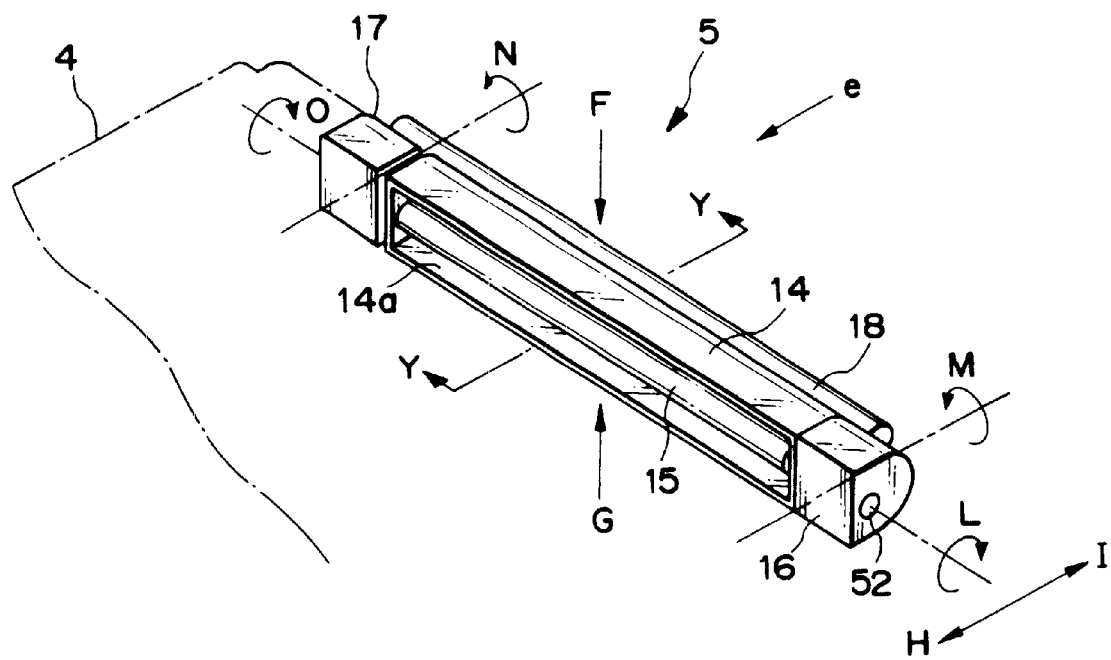
FIGS. 2A and 2B are respectively a perspective view and a sectional view taken along a line Y—Y in FIG. 2A, which show the arrangement and effect of an illumination device of the image input apparatus according to the embodiment of the present invention.
Figure 2B:
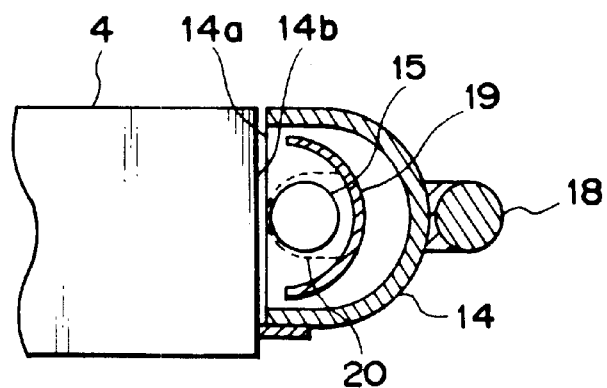
Figure 3A:
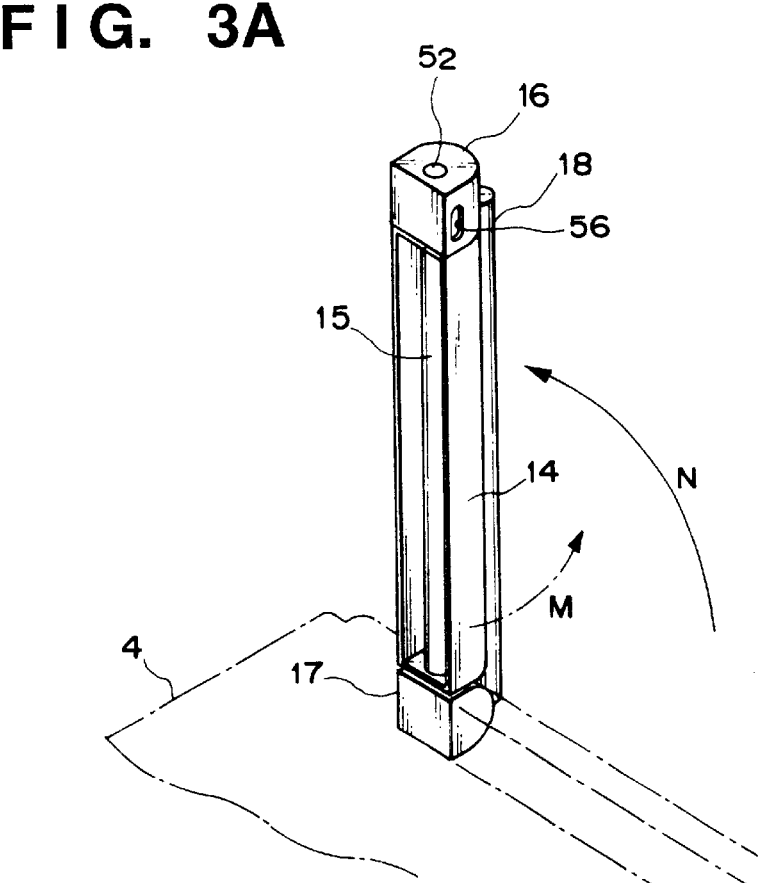
FIGS. 3A and 3B are perspective views for explaining the arrangement and operation of the illumination device of the image input apparatus according to the embodiment of the present invention.
Figure 3B:
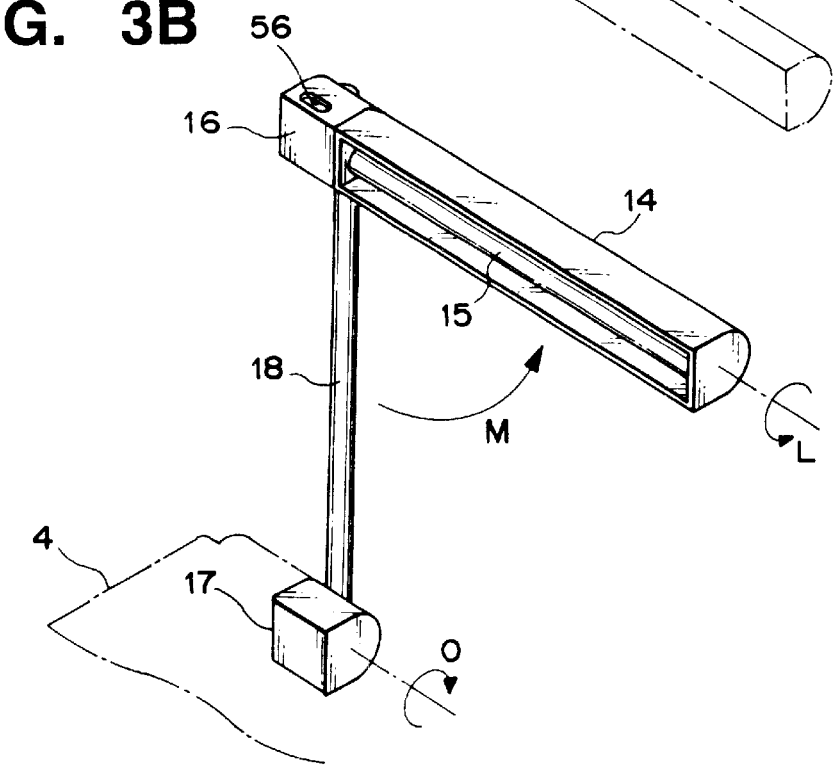
Figure 4:
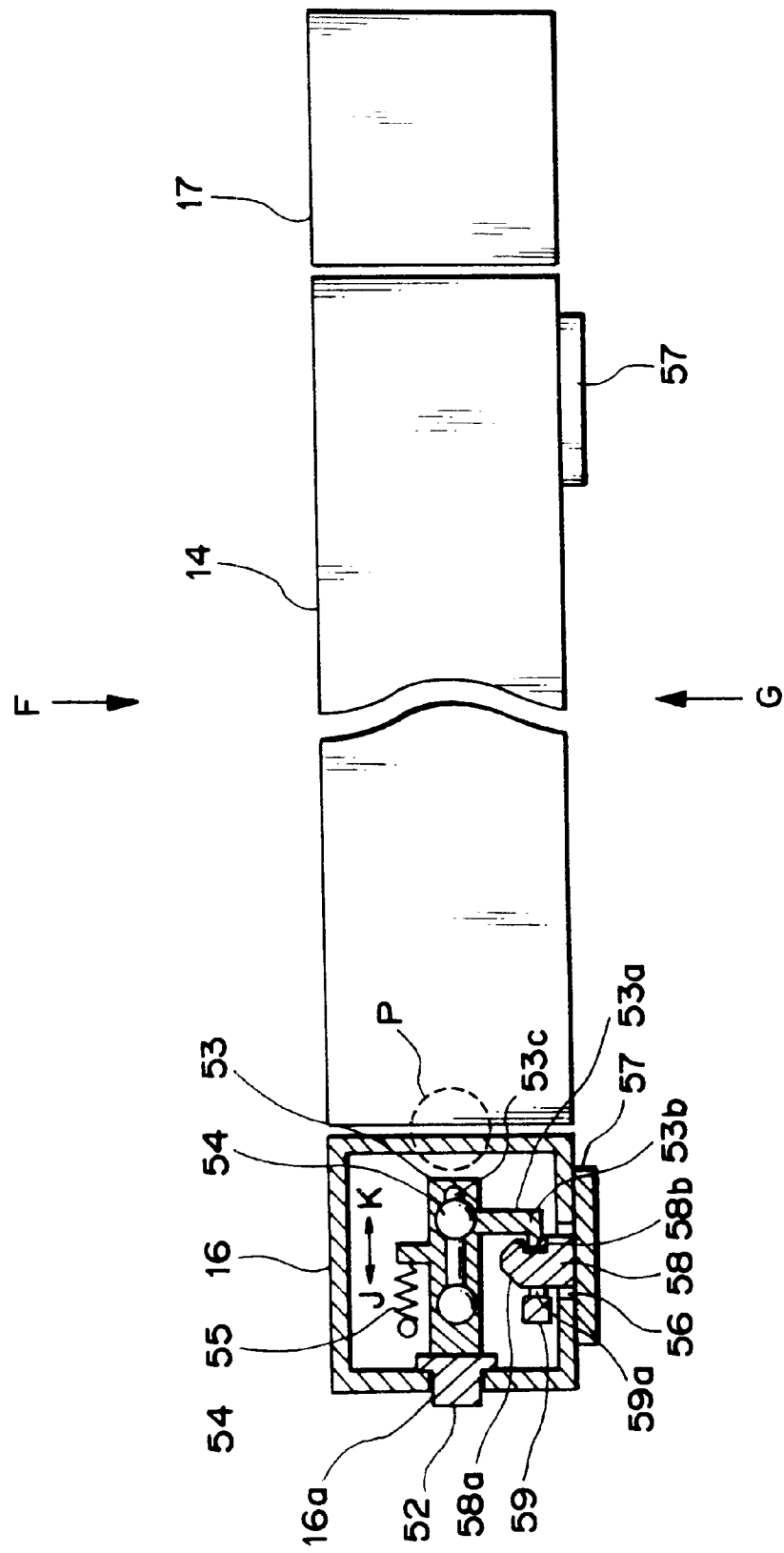
FIG. 4 is a sectional view showing the arrangement of a lock means for the illumination device of the image input apparatus according to the embodiment of the present invention.

FIGS. 2A to 3B are explanatory views of the structure of the illumination device 5, and FIG. 4 is a sectional view showing the arrangement of a lock means for the illumination device 5. Referring to FIGS. 2A to 4, reference numeral 14 denotes a lamp case; 16 and 17, joints; and 18, a support pipe. The lamp case 14 is formed into a shape which has an opening portion 14a having a length corresponding to the total length, in the longitudinal direction, of the lamp case 14, and holds a fluorescent lamp 15 therein. In FIG. 2B, reference numeral 19 denotes a reflection plate; and 20, sockets (dotted line). The reflection surface of the reflection plate 19 is defined by a curved surface, and is formed to have a length roughly equal to the total length, in the longitudinal direction, of the lamp case 14. Furthermore, the reflection plate 19 is formed so that its reflection surface faces the opening portion 14a of the lamp case 14. The sockets 20 are arranged at the two end portions, in the longitudinal direction, of the lamp case 14, and are fixed in position by the reflection plate 19. The fluorescent lamp 15 is held by these pair of sockets 20. The fluorescent lamp 15 is detachably attached to the sockets 20. However, this arrangement is known to those who are skilled in the art, and a detailed description thereof will be omitted.

In the storage state shown in FIG. 2A, the illumination device 5 is stored, so that the opening portion 14a of the lamp case 14 faces the side surface portion 4b of the original table 4. In this state, the illumination device 5 is locked with the original table 4. That is, the illumination device 5 holds this state independently of any loads acting from the directions of arrows F, G, H, and I in FIG. 2A.

The lock means of the illumination device 5 will be described below with reference to FIG. 4. Note that FIG. 4 is a side sectional view of FIG. 2A when viewed from the direction of an arrow e in FIG. 2A, and the support pipe 18 is not shown for the sake of simplicity. Referring to FIG. 4, reference numeral 52 denotes an unlock button for unlocking the locked state of the illumination device 5; 53, a lock plate arranged integrally with the unlock button 52; 54, a pair of support shafts for slidably supporting the lock plate 53; 55, a lock spring; 56, a lock hole formed on the joint 16; 57, a pair of plates arranged on the side surface portion 4b of the original table 4 to stabilize the posture of the illumination device 5 upon storage; 58, a lock pin; and 59, a position sensor.

The unlock button 52 is held to be slidable by a predetermined amount in the directions of arrows J and K by the pair of support shafts 54 which engage with (are fitted in) an elongated hole 53c formed on the lock plate 53. The lock plate 53 is normally biased by the lock spring 55 in the direction of the arrow J, so that the unlock button 52 partially protrudes from an opening window 16a formed on the joint 16. The lock plate 53 is constituted by an arm portion 53a and a lock pawl 53b formed at the distal end portion of the arm portion 53a, which move in the same directions as the moving directions of the lock plate 53 (the directions of the arrows J and K) upon operation of the unlock button 52.

The fixing plates 57 contact the bottom surfaces of the lamp case 14 and the joint 16, as shown in FIG. 4, in the storage state of the illumination device 5, and hold and restrict the illumination device 5, so that the illumination device 5 does not pivot against a load acting from the direction of an arrow F. The lock pin 58 formed on the fixing plate 57 on the side of the joint 16 is formed into a columnar shape having, e.g., a conical portion 58a at its distal end, and a lock groove 58b is formed at a predetermined position on a straight portion of the column. In the state shown in FIG. 4, the lock pawl 53b of the lock plate 53 engages with the lock groove 58b of the lock pin 58. Since the lock plate 53 is biased in the direction of the arrow J, this engaging state is not easily released.

The lock hole 56 formed on the joint 16 is formed by an elongated hole having a predetermined length, and the major axis direction of the elongated hole matches the sliding directions J and K of the lock plate 53. The width, in the minor axis direction, of the elongated hole is slightly larger than the diameter of the lock pin 58, so that the lock hole 56 attains alignment to the illumination device 5 in the storage state, and at the same time, can hold the illumination device 5 in the locked state independently of any loads acting from the directions of the arrows H and I in FIG. 2A.

In the locked state of the illumination device 5, a contact piece 59a of the position sensor 59 provided to the joint 16 contacts the lock pin 58, and at this time, its detection signal is set in the ON state. In this embodiment, the position sensor 59 uses a mechanical detection switch. Note that the present invention is not particularly limited to the mechanical detection switch, and a photosensor such as a phototransistor, a magnetic switch such as a proximity switch, or the like may be used. The position sensors 59 are respectively provided to the joints 16 of the illumination devices 5 and 6, and their detection signals are supplied to the controller 80 arranged in the apparatus, as shown in FIG. 9.

The operation of the illumination devices and the transmission illumination device will be described below with reference to the flow chart in FIG. 10.

When the operator operates the illumination switch 12 provided to the operation panel 11 (step S1), an operation signal of the switch is supplied to the controller 80, and the controller checks if both the position sensors 59 of the right and left illumination devices are in the ON state (step S2). If both the position sensors are in the ON state, the controller controls to turn on the transmission illumination device 13 and to inhibit the fluorescent lamp 15 of the illumination device 5 from being turned on (step S3). On the other hand, when the operator-operates the illumination switch 12 while the detection signal from each position sensor 59 is in the OFF state (i.e., when the illumination device 5 is set in a state other than that shown in FIG. 2A), the signal is supplied to the controller 80, and the controller 80 controls to turn on the fluorescent lamp 15 of the illumination device 5 and to inhibit the transmission illumination device 13 from being turned on (step S4).

Furthermore, the illumination device 5 is arranged, so that the respective joint portions pivot by a predetermined amount so as to attain a folding operation, to adjust the illumination angle of light, and the like. More specifically, as shown in FIG. 2A, the lamp case 14 is axially supported by the joint 16 to be pivotal by a predetermined amount in the direction of an arrow L in FIG. 2A. The joint 16 is axially supported by the support pipe 18 to be pivotal by a predetermined amount in the direction of an arrow M in FIG. 2A. Furthermore, the support pipe 18 is axially supported by the joint 17 to be pivotal by a predetermined amount in the direction of an arrow N in FIG. 2A. The joint 17 is axially supported by the original table 4 to be pivotal by a predetermined amount in the direction of an arrow O in FIG. 2A. As described above, the illumination device 5 is designed to be pivotal at a plurality of pivot portions. Each of these pivot portions has a pivot mechanism (to be described below), and can be locked at any pivot angle.

Figure 5A:
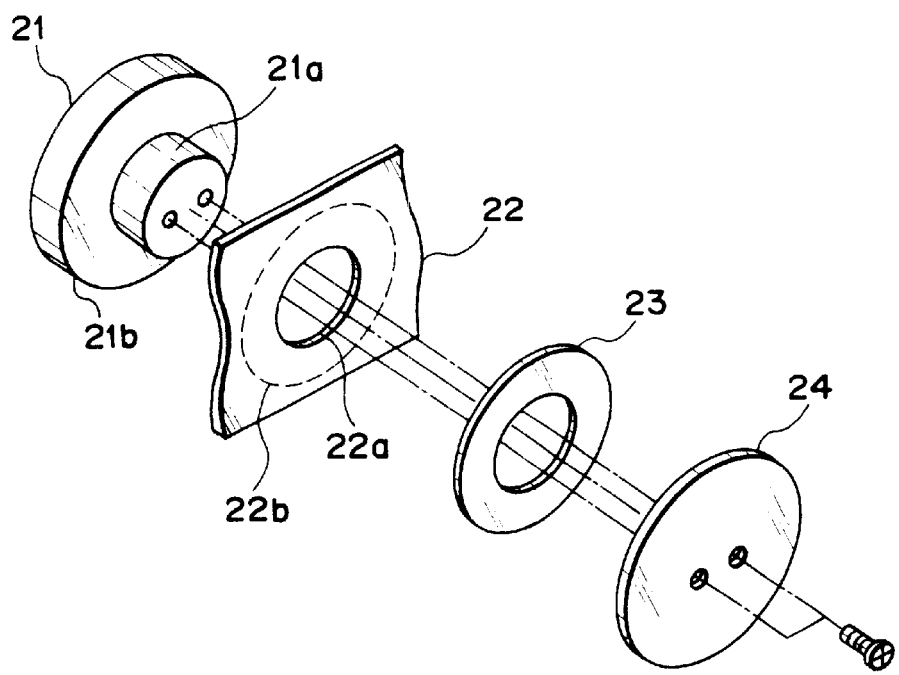
FIGS. 5A and 5B are respectively a perspective view and a sectional view showing the arrangement of a pivot mechanism of the illumination device of the image input apparatus according to the embodiment of the present invention.
Figure 5B:
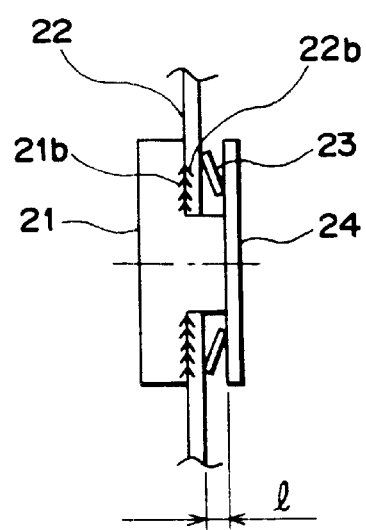

The arrangement of the pivot mechanism will be explained below. FIGS. 5A and 5B show the pivot mechanism in this embodiment. The pivot mechanisms arranged in the respective pivot portions have substantially the same basic structure.

Referring to FIGS. 5A and 5B, reference numeral 21 denotes a pivot base; 22, a pivot member; 23, a belleville spring; and 24, a pressing plate. The pivot base 21 consists of a plastic member having high slidability and wear resistance. In this embodiment, the pivot base 21 consists of a resin material such as Duracon. The pivot member 22, the pressing plate 24, and the belleville spring 23 consist of metal steel plates with high wear and corrosion resistances. The belleville spring 23 is formed into a low-profile conical shape.

When such pivot mechanism is assembled, a slide hole 22a formed on the pivot member 22 engages with a small cylindrical portion 21a of the pivot base 21. The belleville spring 23 is placed on the pivot member 22, and finally, the pressing plate 24 is fixed by screws to the pivot base 21. When the pressing plate 24 is fixed by screws, the belleville spring 23 is compressed by a predetermined amount, and a slide surface 21b of the pivot base 21 is in press contact with a slide surface 22b of the pivot member 22 by an appropriate load with a predetermined amount. Thus, when the pivot base 21 and the pivot member 22 are pivoted in the opposite directions, the frictional force generated by the contact force between the slide surfaces 21b and 22b generates a torque for regulating the pivotal motions. Therefore, in order to pivot the pivot base 21 and the pivot member 22, a predetermined load or torque that overcomes the regulating torque must be applied. Furthermore, with this contact force, each pivot portion can be locked at any position within its pivot range.

By changing a width l shown in FIG. 5B, the load generated by the belleville spring 23 can be changed. In this embodiment, the belleville spring 23 is used as a torque generation means. However, the present invention is not limited to this. For example, a wave washer or a general coil spring may be used.

The pivot mechanism with the above arrangement is provided to each pivot portion of the illumination device 5. An example will be explained below wherein the pivot mechanism is applied to the pivot portion between the lamp case 14 and the joint 16. Referring to FIG. 4, in the case of a pivot portion between the lamp case 14 and the joint 16, the lamp case 14 and the joint 16 are pivotally coupled via the pivot mechanism by arranging one of the lamp case 14 and the joint 16 in correspondence with the pivot base 21 or pressing plate 24, and arranging the other in correspondence with the pivot member 22. In this case, the pivot base 21, the pivot member 22 or the pressing plate 24 may be constituted by the lamp case 14 or the joint 16 itself. The pivot mechanism can be similarly applied to other pivot portions.

The assembling operation when the illumination device 5 is used will be described below. The following description will be made with reference especially to FIGS. 2A to 3B.

The unlock button 52 (FIG. 2A) is depressed to unlock the locked state of the illumination device 5. Upon depression of the unlock button 52, the lock plate 53 shown in FIG. 4 slides in the direction of an arrow K in FIG. 4. Thus, the lock pawl 53b disengages from the lock groove 58b of the lock pin 58. Thereafter, the illumination device 5 is moved to an upright state while depressing the unlock button 52. At this time, the support pipe 18 is pivoted about the joint 17 in the direction of an arrow N (FIG. 3A). When the illumination device 5 is moved to the upright state, the detection signal from the position sensor 59 changes to the OFF state (see FIG. 10).

The support pipe 18 pivots through about 90° with respect to the joint 17 from the position of FIG. 2A in the direction of the arrow N, and stops at the position shown in FIG. 3A. The support pipe 18 can pivot through about 90° with respect to the joint 17 but cannot pivot any more due to the presence of a regulation means (not shown). Note that the regulation means is realized by arranging stopper members, and the like at appropriate positions in the pivot mechanism in the pivot portion between the joint 17 and the support pipe 18.

Subsequently, the lamp case 14 is pivoted in the direction of the arrow M. At this time, the joint 16 pivots with respect to the support pipe 18. The joint 18 pivots through almost 90° with respect to the support pipe 18 from the position in FIG. 3A in the direction of the arrow M, and stops at the position shown in FIG. 3B. In this case as well, the joint 16 can pivot through about 90° with respect to the support pipe 18 but cannot pivot any more since it is regulated by a regulation means (not shown). At the position shown in FIG. 3B, the support pipe 18 stands substantially perpendicularly with respect to the object placing surface 4a of the original table 4, and the lamp case 14 is held substantially horizontally.

Furthermore, the lamp case 14 is pivoted from the state shown in FIG. 3B in the direction of the arrow L. At this time, the lamp case 14 pivots with respect to the joint 16. The lamp case 14 can pivot through about 90° with respect to the joint 16 from the position in FIG. 3B in the direction of the arrow L, but cannot pivot any more due to the presence of a regulation means (not shown). Since the lamp case 14 can stop at any pivot position by the above-mentioned pivot mechanism, the operator can freely adjust the irradiation angle of light within the pivot range through about 90°.

In order to adjust the irradiation angle of light, the entire illumination device 5 can be pivoted with respect to the original table 4. At this time, the joint 17 pivots with respect to the original table 4, and is pivotal through about 30° from the position shown in FIG. 3B in the direction of the arrow O. Note that the joint 17 is regulated by a regulation means (not shown) so as not to pivot any more.

Figure 6:
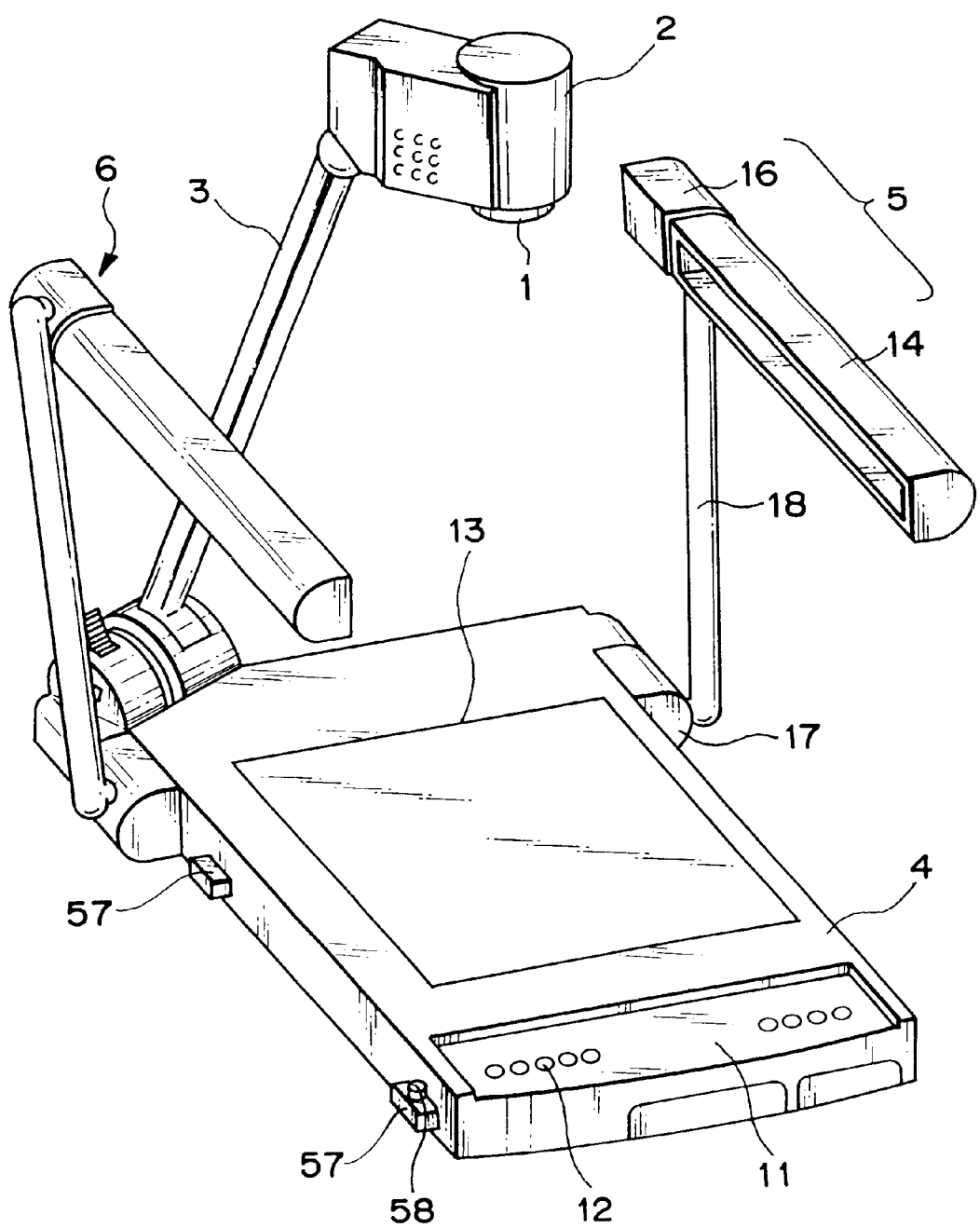
FIG. 6 is a perspective view showing the assembled/use state of the image input apparatus according to the embodiment of the present invention.

The illumination device 5 (the same applies to the illumination device 6) is assembled in this manner, and FIG. 6 shows an example of use of these devices. In FIG. 6, especially, the lamp cases 14 and the support pipes 18 are held at positions after they are pivoted by appropriate amounts so as to adjust the irradiation angles of light. In this state, when the operator operates the illumination switch 12 on the operation panel 11 (step S1 in FIG. 10), the operation signal is output to the controller 80, as shown in the block diagram in FIG. 9. At this time, since the detection signals from the position sensors 59 of the illumination devices 5 and 6 are in the OFF state (i.e., indicating positions other than the storage positions) (step S2), the controller controls to turn on the fluorescent lamps 15 of the illumination devices 5 and 6 (step S4). Thus, even when the light amount around the apparatus is insufficient, the light source can be compensated for, and an object image can be clearly displayed on the screen of the monitor 9.

The folding operation when the illumination device 5 is stored will be described below. Note that the following description will be made with reference especially to FIG. 1 and FIGS. 6 to 8B.

In this storage operation, any of the post 3 and the illumination devices 5 and 6 may be folded first or example, when the illumination devices 5 and 6 stand upright, as shown in FIG. 6, an operation opposite to the above-mentioned assembling operation is performed.

The storage operation of the camera head 2 and the post 3 will be described below. As described above, the camera head 2 is pivotally axially supported by the post 3 so as to be located at one of the use position (dotted line) and the storage position (solid line) in FIG. 8A.

Figure 7A:
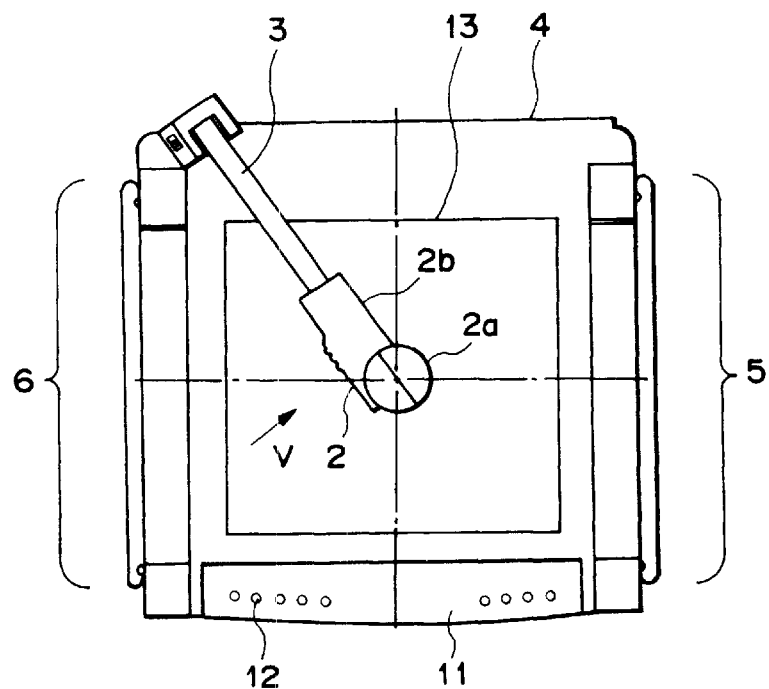
FIGS. 7A and 7B are respectively a plan view and a side view for explaining the pivot operation of a camera head in the image input apparatus according to the embodiment of the present invention.
Figure 7B:
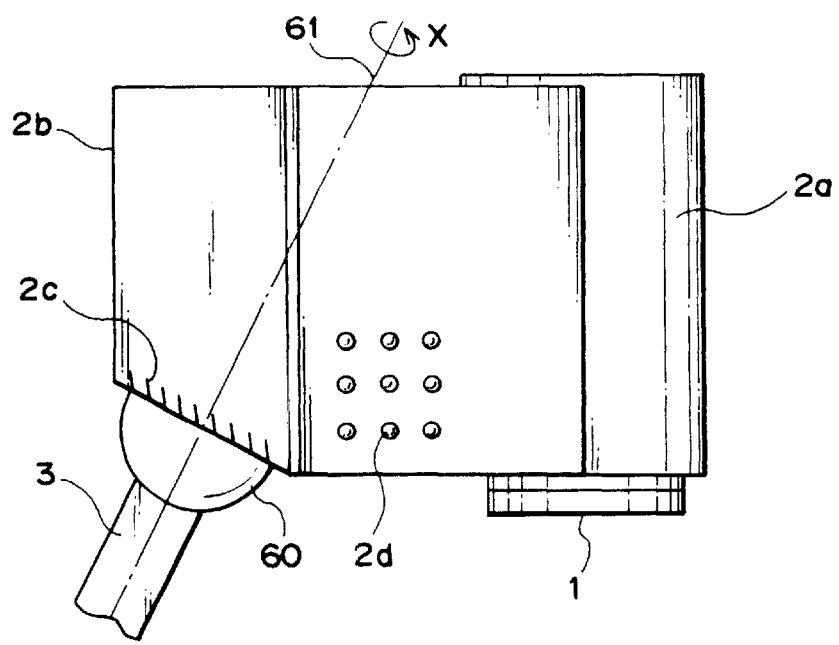

The pivot operation of the camera head 2 will be described below with reference to FIGS. 7A and 7B. FIG. 7A is a top view of the apparatus main body, and FIG. 7B is a side view of FIG. 7A when viewed from the direction of an arrow V. The camera head 2 has a cylindrical portion 2a which holds the lens 1, and a block 2b which holds boards (not shown) for controlling the lens 1, performing image signal processing, and the like. In the use state, the block 2b of the camera head 2 is located in the same direction as the extending direction of the post 3, as shown in FIG. 7A.

The camera head 2 is axially supported by a joint block 60 fixed to the distal end portion of the post 3. A junction surface 2c of the camera head 2 with the joint block 60 is defined by a slant surface formed by cutting the head 2 in a direction perpendicular to the extending direction of the post 3. A pivot mechanism is provided to the coupled portion between the camera head 2 and the joint block 60. With this mechanism, the camera head 2 is axially supported by the joint block 60 (post 3) to be pivotal through a predetermined angle. Note that the pivot mechanism is the same as that described above.

The camera head 2 is pivoted in the direction of an arrow X shown in FIG. 7B or 8A. With this operation, the camera head 2 pivots about a center axis 61 of the post 3. As shown in FIG. 8A, the camera head 2 can pivot within the range through 90° from the use position (dotted line) to the storage position (solid line), but is regulated by a regulation means (not shown) so as not to pivot any more. The camera head 2 at the storage position is held horizontally with respect to the center shaft 61 of the post, as shown in FIG. 8A.

The camera head 2 is pivoted to its storage position, and the release lever 8 is depressed to release the locked state of the post 3. Then, the post 3 is pivoted in the direction of an arrow W in FIG. 8A to lock the camera head 2 at the storage position. A shock absorber 2d is provided to a surface, facing the original table 4, of the camera head 2. The shock absorber 2d consists of a rubber member in this embodiment, but the present invention is not particularly limited to this. In the storage state, the shock absorber 2d provided to the camera head 2 contacts the object placing surface 4a of the original table 4, and prevents the object placing surface 4a from being damaged. A damper mechanism (not shown) is provided to the fulcrum 7 and prevents the post 3 from immediately falling upon operation (upon release of the locked state). In the apparatus main body in the storage state, a carrying handle 25 (FIG. 8B) used for carrying can be pulled out from the original table 4.

<Modification of Embodiment>

In the above-mentioned embodiment, the light sources of the illumination device 5 (and the illumination device 6) and the transmission illumination device 13 are independently arranged, the upright position of the illumination device 5 is detected by a detection means, and the light sources to be turned on are selectively controlled in accordance with the detection signal from the detection means. Furthermore, according to a modification of the embodiment of the present invention, the light source of the illumination device 5 can also serve as a transmission illumination light source. An example herein the light source is commonly used for both direct irradiation and transmission irradiation will be explained below.

Figure 11:
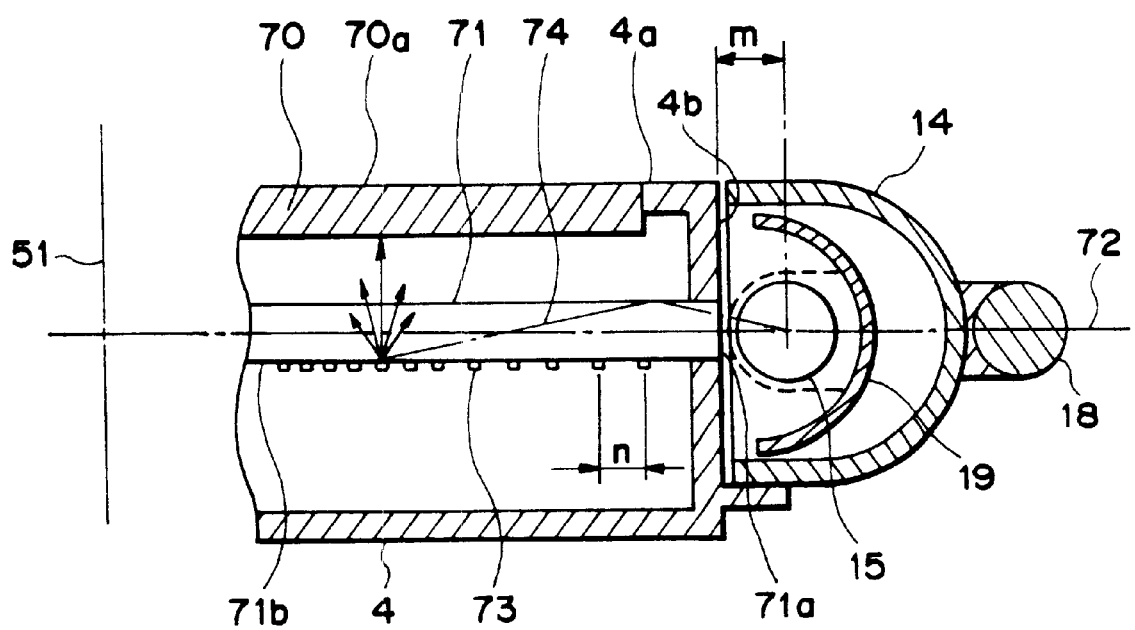
FIG. 11 is a sectional view showing principal part of an original table and the illumination device in the image input device according to a modification of the embodiment of the present invention.
Figures 12A, 12B:
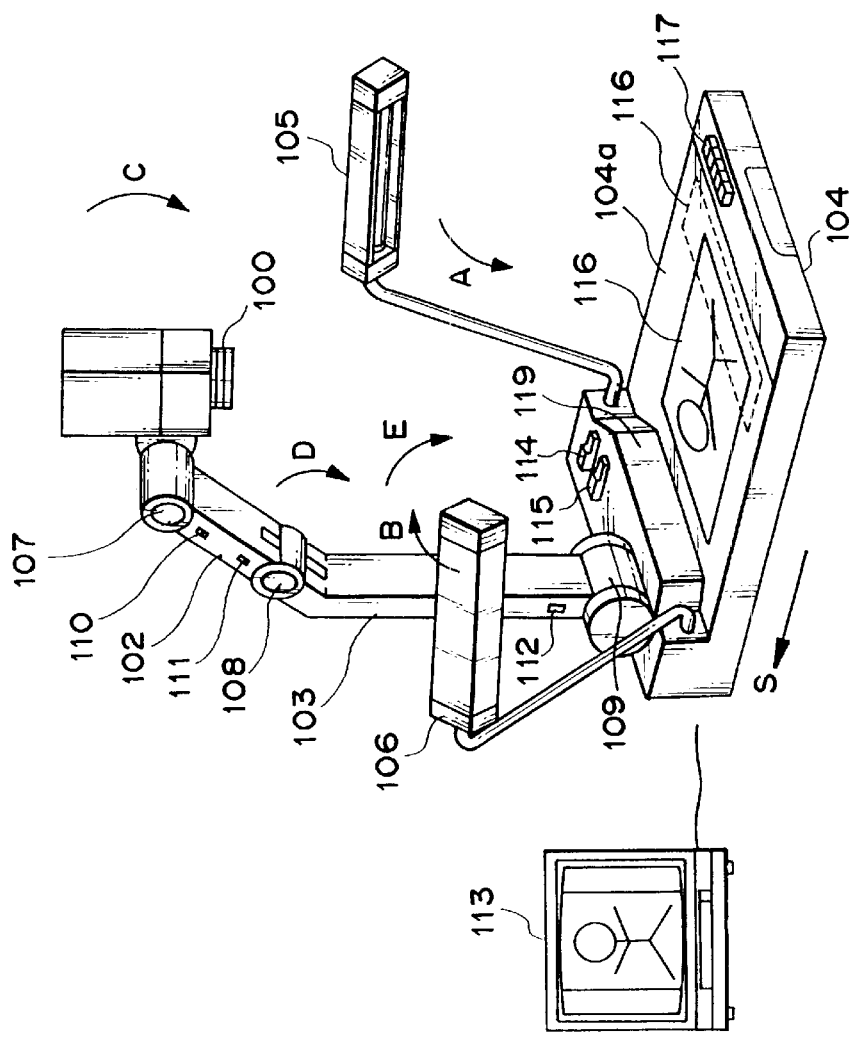

FIG. 11 is a schematic sectional view of the original table 4 and the illumination device in the storage state of the illumination device (5 or 6) according to a modification of the embodiment of the present invention. Since the arrangement other than that of this modification to be described below is the same as that of the above embodiment, a detailed description thereof will be omitted. The same reference numerals denote substantially the same members as in the above embodiment.

Referring to FIG. 11, reference numeral 70 denotes a diffusion plate; and 71, a light guide plate. The diffusion plate 70 is integrally arranged on the original table 4, so that its upper surface 70a is arranged at a level roughly equal to or slightly lower than that of the object placing surface 4a of the original table 4. The diffusion plate 70 consists of a milk white acrylic resin or a milk white polycarbonate.

The light guide plate 71 is arranged inside the original table 4, so that its end face 71a is arranged at a level roughly equal to or slightly lower than that of the side surface portion 4b of the original table 4. In the apparatus of the present invention, the light guide plate 71 consists of a transparent acrylic plate. Furthermore, dots 73 are silkscreen-printed in a grid pattern on a lower surface 71b (a surface opposite to the diffusion plate 70) of the light guide plate 71, and the dot pitch, n, is set to decrease toward the optical axis 51 (the center of the original table 4) of the lens 1.

The level of the light guide plate 71 with respect to the original table 4 is set to be substantially equal to that of a center 72 of the fluorescent lamp 15 of the illumination device in the storage state. Furthermore, the distance, m, between the end face 71a (the side surface portion 4b of the original table 4) of the light guide plate 71 and the surface (on the side close to the light guide plate 71) of the fluorescent lamp 15 is preferably set to be 5 mm or less.

With this arrangement, when the operator operates the illumination switch 12 on the operation panel 11, an operation signal is output to a controller (not shown) to turn on the fluorescent lamp 15. Light irradiated onto the end face 71a of the light guide plate 71 is guided inside the light guide plate 71. Irradiated light 74 propagates through the light guide plate 71 while being reflected by the inner wall (a boundary surface with air) of the light guide plate 71 several times. Since some light components leak outside the light guide plate 71 every time the light arrives the inner wall of the light guide plate 71, the amount of light decreases during propagation. The propagation direction of the irradiated light 74 is converted into a direction perpendicular to the direction of the diffusion plate 70 when the light is reflected by interference of the dots 73 printed on the lower surface of the light guide plate 71. The light 74 converted into the vertical direction is irradiated outside the light guide plate 71.

The light sources (the fluorescent lamps 15) are arranged on the two end portions of the light guide plate 71, and the illuminance of light inevitably decreases as the light propagates toward the central portion of the original table 4. In order to irradiate the entire surface of the diffusion plate 70 with light as uniform as possible, the pitch n of the dots 73 is decreased toward the center of the original table 4. Thus, the diffusion plate 70 emits light from its entire surface in a substantially uniform amount. On the other hand, when the illumination devices are to be used in the upright state, they can be assembled and used, as has been described in the above embodiment. In this case as well, upon operation of the illumination switch 12, the fluorescent lamps 15 are turned on to illuminate an original or the like on the original table 4 with light, thus obtaining a satisfactory image.

When the light source of the illumination device is also used as a transmission illumination light source, the apparatus main body can be rendered compact and lightweight, and the cost of the entire apparatus can be reduced. In this case, an appropriate operation of the apparatus is guaranteed.

The embodiment of the present invention has been described. However, the present invention is not particularly limited to the numerical values used in the above embodiment and these values may be appropriately changed within the scope of the present invention. For example, in particular, the pivot angle or the like of the pivot mechanism arranged in each pivot portion of the illumination device is preferably set to be 90°. However, the pivot angle may be set to be larger or smaller than 90°.

As described above, according to the above embodiment, an image input apparatus which allows an easy and adequate handling operation can be provided. More specifically, the illumination devices are stored in portions other than the image pickup region of the camera head. With this structure, an adequate operation can be realized independently of the storage/assembling order. The post for supporting the camera head can be raised/lowered from/to the corner of the original table, and the illumination devices are axially supported to be foldable in the side surface portions, i.e., portions other than the image pickup region, of the original table. With this structure, operability of arrangements of an original in an image pick up operation can be improved. Furthermore, when the light sources of the illumination devices are commonly used as a transmission illumination light source in the storage state of the illumination devices, a cost reduction by means of reductions of parts cost and the number of assembling steps can be attained.

As many apparently widely different embodiments of the present invention can be made without departing from the spirit and scope thereof, it is to be understood that the invention is not limited to the specific embodiments thereof except as defined in the appended claims.

What is claimed is:

1. An image input apparatus for picking up an image of an object using image pickup means, and outputting an image signal of the object, comprising:
   a base portion on which the object is placed;
   a post for supporting said image pickup means to be located above said base portion; and
   illumination means for illuminating the object, wherein said post can be raised/lowered from/to a surface of said base portion, on which the object is placed,
   said illumination means, which is provided with enclosures, each having an opening portion, can be raised/lowered from/to and are foldable to periphery portions of said base portion, and
   the opening portions of each enclosure of said illumination means are covered with the periphery portions of said base portion when said image input apparatus is in a storage state having a collapsed configuration with said image pickup means resting on said base portion.

2. The apparatus according to claim 1, wherein said post and said illumination means can be solely or simultaneously raised/lowered.

3. The apparatus according to claim 1, wherein when said illumination means is folded, said illumination means can be stored at a level lower than a level of the surface on which the object is placed.

4. The apparatus according to claim 1, wherein one end of said post is axially supported on a corner of said base portion.

5. The apparatus according to claim 1, further comprising transmission illumination means, which is provided in said base portion, for illuminating the surface of said base portion from its underside, and wherein said illumination means, which is folded to the periphery portion of said base portion, provides illumination of the object via said transmission illumination means.

6. The apparatus according to claim 1, further comprising a supporting member for supporting said illumination means to be located above said base portion, wherein one end of said supporting member is supported to be pivotally movable to a side portion of said base portion.

7. An image input apparatus for picking up an image of an object using image pickup means, and outputting an image signal of the object, comprising:
   a base portion on which the object is placed;
   a post for supporting said image pickup means to be located above said base portion;
   illumination means for illuminating the object, wherein said illumination means has enclosures with opening portions, and the opening portions of each enclosure of said illumination means are covered with periphery portions of said base portion when said image input apparatus is in a storage state having a collapsed configuration with said image pickup means resting on said base portion; and
   a supporting member for supporting said illumination means to be located above said base portion,
   wherein said post can be raised/lowered from/to a surface of said base portion, on which the object is placed,
   one end of said supporting member being supported to be pivotally movable at the periphery portions of said base portion, and
   said illumination means can be raised/lowered from/to and are foldable to the periphery portions of said base portion.

8. The apparatus according to claim 7, wherein said post and said illumination means can be solely or simultaneously raised/lowered.

9. The apparatus according to claim 7, wherein when said illumination means is folded, said illumination means can be stored at a level lower than a level of the surface on which the object is placed.

10. The apparatus according to claim 7, wherein one end of said post is axially supported on a corner of said base portion.

11. An image input apparatus for picking up an image of an object using image pickup means, and outputting an image signal of the object, comprising:
   a base portion on which the object is placed;
   a post for supporting said image pickup means to be located above said base portion;
   illumination means for illuminating the object;
   a supporting member for supporting said illumination means to be located above said base portion,
   wherein said post can be raised/lowered from/to a surface of said base portion, on which the object is placed,
   one end of said supporting member being supported to be pivotally movable at the periphery portions of said base portion,
   said illumination means can be raised/lowered from/to and are foldable to the periphery portions of said base portion; and transmission illumination means, which is provided in said base portion, for illuminating the surface of said base portion from its underside;

a switch for turning on said illumination means and said transmission illumination means;

detection means for detecting positions of said illumination means; and control means for, when a user operates said switch and when the position of said illumination means are at the periphery portions of said base portion as storage positions, inhibiting said illumination means from being turned on, and for, when the positions of said illumination means are other than the storage positions, inhibiting said transmission illumination means from being turned on.

12. An image input apparatus for picking up an image of an object using image pickup means, and outputting an image signal of the object, comprising:

a base portion on which the object is placed;

a post for supporting, said image pickup means to be located above said base portion;

illumination means for illuminating the object;

a supporting member for supporting said illumination means to be located above said base portion, wherein said post can be raised/lowered from/to a surface of said base portion, on which the object is placed, one end of said supporting member being supported to be pivotally movable at the periphery portions of said base portion, said illumination means can be raised/lowered from/to and are foldable to the periphery portions of said base portion; and transmission illumination means, which is provided in said base portion, for illuminating the surface of said base portion from its underside;

a switch for turning on said illumination means and said transmission illumination means;

detection means for detecting positions of said illumination means; and control means for, when a user operates said switch and when the positions of said illumination means are at the periphery portions of said base portion as a storage positions, inhibiting said illumination means from being turned on and turning on said transmission illumination means, and for, when the position of said illumination means are other than the storage position, inhibiting said transmission illumination means from being turned on and turning on said illumination means.

13. An image input apparatus for picking up an image of an object using image pickup means, and outputting an image signal of the object, comprising:

a base portion on which the object is placed;

a post for supporting said image pickup means to be located above said base portion;

illumination means for illuminating the object; and transmission illumination means for illuminating a surface, on which the object is placed, of said base portion from a rear side, a switch for turning on said illumination means and said transmission illumination means;

detection means for detecting a position of said illumination means; and control means for, when a user operates said switch and when the position of said illumination means corresponds to a storage position, inhibiting said illumination means from being turned on, and for, when the position of said illumination means is other than the storage position, inhibiting said transmission illumination means from being turned on, wherein said post can be raised/lowered from/ to a surface, on which the object is placed, of said base portion, and said illumination means can be raised/lowered from/to and is foldable to a side portion of said base portion.

14. An image input apparatus for picking up an image of an object using image pickup means, and outputting an image signal of the object, comprising:

a base portion on which the object is placed;

a post for supporting said image pickup means to be located above said base portion;

illumination means for illuminating the object;

transmission illumination means for illuminating a surface, on which the object is placed, of said base portion from a rear side;

a switch for turning on said illumination means and said transmission illumination means;

detection means for detecting a position of said illumination means; and control means for, when a user operates said switch and when the position of said illumination means corresponds to a storage position, inhibiting said illumination means from being turned on and turning on said transmission illumination means, and for, when the position of said illumination means is other than the storage position, inhibiting said transmission illumination means from being turned on and turning on said illumination means, wherein said post can be raised/lowered from/to a surface, on which the object is placed, of said base portion, and said illumination means can be raised/lowered from/to and is foldable to a side portion of said base portion.

* * * * *